Sept. 23, 1941.   R. M. MAGNUSON   2,256,745
APPARATUS AND METHOD FOR PRECOOLING VEGTABLES AND THE LIKE
Filed Dec. 13, 1937   3 Sheets-Sheet 1

INVENTOR.
Roy. M. Magnuson.
BY Philip A. Minnis.
ATTORNEY.

Sept. 23, 1941.   R. M. MAGNUSON   2,256,745
APPARATUS AND METHOD FOR PRECOOLING VEGTABLES AND THE LIKE
Filed Dec. 13, 1937   3 Sheets-Sheet 3

INVENTOR.
Roy. M. Magnuson.
BY Philip A. Minnis.
ATTORNEY.

Patented Sept. 23, 1941

2,256,745

UNITED STATES PATENT OFFICE 2,256,745

APPARATUS AND METHOD FOR PRECOOLING VEGETABLES AND THE LIKE

Roy M. Magnuson, San Jose, Calif., assignor to Food Machinery Corporation, San Jose, Calif., a corporation of Delaware Application December 13, 1937, Serial No. 179,538

10 Claims. (Cl. 62—104)

My invention relates to apparatus and methods for precooling vegetables and the like before loading in refrigerator cars or in refrigerating warehouses, and is concerned more particularly with apparatus and methods of the character referred to which will provide effective precooling in a minimum period of time, and at a minimum cost, while providing a more efficient precooling of vegetables and similar products.

The practice in packing vegetables varies with different varieties, some being placed in crates or the like in the field, while others are prepared and trimmed in the packing houses before being crated or placed in hampers for shipment. With either course of handling, the temperature of the vegetable when ready to be placed in the refrigerator car will usually be from 60° to 80° F., whereas to preserve the vegetable in a fresh, crisp condition, it is desirable that the same be maintained below 40° F. during its shipment and storage prior to sale.

It has been found that when the vegetables are placed in refrigerator cars at their natural temperature and the ice in the bunkers of the car is relied upon to bring them down to the proper temperature for preservation, that only mediocre results have been obtained and a part of the shipment may arrive at the market unfit for sale, or at least in a deteriorated condition which will not bring top prices. In addition, the train must be stopped frequently to re-ice the cars, resulting in a loss of time in reaching the market and a large consumption of ice in an unsuccessful endeavor to preserve all of the fruit for sale in prime condition.

As a result of the above conditions, efforts have been made to precool the vegetables before being placed in refrigerator cars or in the storage warehouses to remove the "field" heat and the heat of respiration, so that when placed therein they are at the desired temperature for safe keeping and consequently the icing of the cars need only be made in sufficient amount to maintain the desired temperature. Such precooling results in smaller consumption of ice while in transit, fewer stops for re-icing, and a consequent saving in time in shipment of the vegetables to the market. The reduced time of transit not only provides an improved condition of the produce so that substantially all is in good condition for sale, and loss from wilted or rotted vegetables is substantially reduced, but also reduces the shippers gamble as to changes in market prices between shipment and delivery.

With some products, such as lettuce and broccoli, present practice involves no precooling principally because known precooling methods have not produced satisfactory results, but relies on icing of the product in the car, that is, an attempt is made to completely surround and cover the product with cracked ice, using from 10,000 to 15,000 lbs. of ice per car, and no re-icing is done in transit. However, with such practice the full capacity of the cars cannot be used for the product, and the freight charges per unit weight of the product are high because of the additional weight of the ice. In addition, with such products, bruising which occurs in loading and packing the ice, causes subsequent spoilage of the products.

This invention is concerned with the provision of apparatus and methods for precooling vegetables, fruits and the like to obtain a desired temperature of the product in a minimum time and with a minimum amount of expense, while providing a more effective precooling operation than prior procedure. The practice of my invention not only causes the products to reach the market in better condition, but also provides better keeping qualities of the product after being placed in a stall at room temperature for sale.

It is a general object of my invention, therefore, to provide an improved apparatus and method for precooling vegetables, fruit, and the like before shipment thereof.

Another object of my invention is to provide precooling apparatus and method which provides for improved heat transfer in removing undesired heat from the product being cooled.

Another object of my invention is to provide a precooling operation in which the precooling medium is supplied in a large quantity to the product so as to contact the maximum amount of surface thereof to enhance and hasten the precooling operation.

Another object of my invention is to provide precooling apparatus of economical construction which can be operated easily and economically with a minimum amount of labor.

Other objects of the invention will be apparent from the following description of a preferred embodiment thereof taken in connection with the accompanying drawings, in which Fig. 1 is a perspective view of a precooling apparatus embodying my invention, the view being partly broken away and shown in section to illustrate the constructional features.

Figure 1:
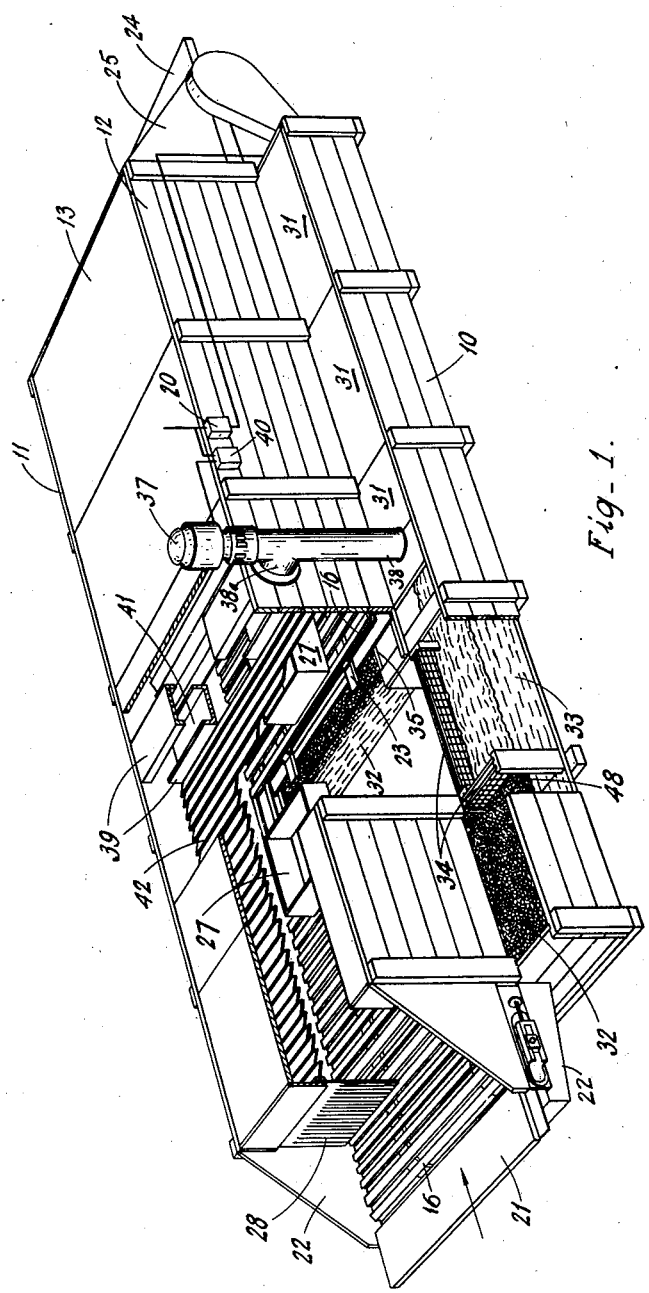
Figure 2:
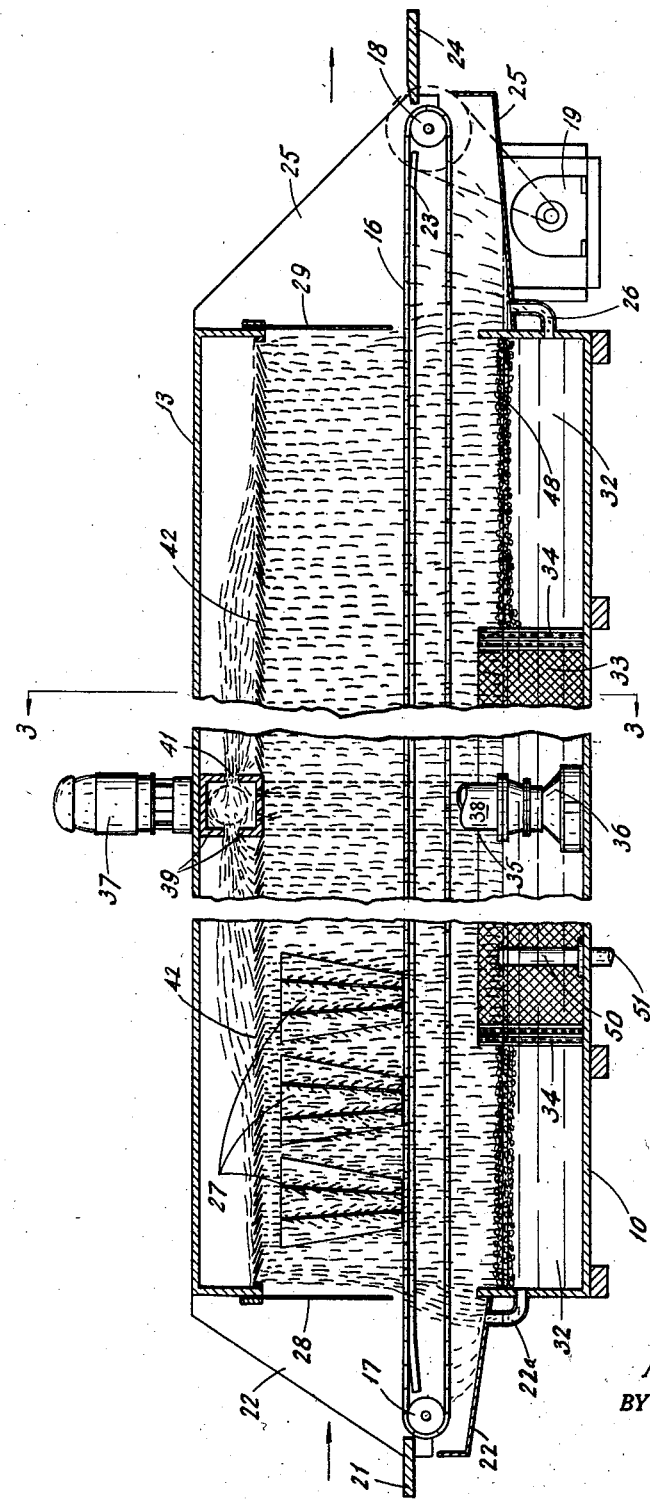
Fig. 2 is a diagrammatic longitudinal sectional view showing the arrangement of the parts and illustrating the circulation of the cooling medium.
Figure 3:
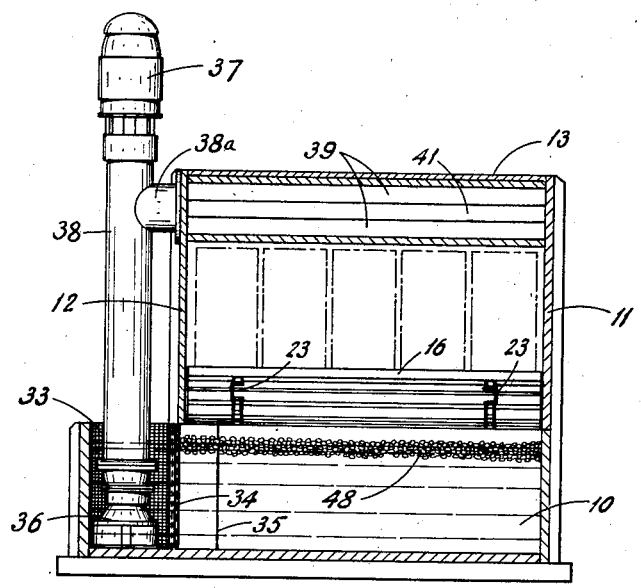
Fig. 3 is a vertical transverse sectional view with certain parts shown in elevation, the view being indicated by the plane of the line 3—3 in Fig. 2.

Referring to Figs. 1, 2 and 3, a preferred form of apparatus embodying my invention includes a tank 10 which also provides the supporting frame for the remaining structure, and above which a box-like inclosure or chamber is formed by side walls 11 and 12, and top wall 13. Preferably, the side wall 11 forms an upward continuation of a side wall of the tank, while the wall 12 is spaced inwardly from the other side wall of the tank to provide a projecting tank portion. The tank 10 may contain a body of cooling liquid which is usually water, above which a slatted conveyor 16 may be provided, being supported at its feed end by idler sprockets 17 and at its discharge end by the drive sprockets 18. The sprockets 18 may be driven from a motor 19, having suitable wire connections with a circuit control 20 mounted on the wall 12. Adjacent the feed end of the conveyor, a feed platform 21 is suitably mounted on an extension 22 of the tank 10, which is provided to receive drainage from the feed end of the conveyor and which communicates with the tank 10 through a return pipe 22a. The upper run of the conveyor may be supported by longitudinally extending tracks 23, and at its discharge end leads to a discharge platform 24 suitably supported on a tank extension 25 having a return pipe 26 leading to the tank 10. The conveyor is driven in the direction of the arrow in Figs. 1 and 2, so that products placed thereon in crates 27, or in bulk, will travel into the chamber under a flexible strip-type apron 28, through the chamber and out under a similar apron 29 at the discharge opening of the chamber.

During the travel of the product through the precooler, it is subjected to a flood volume of cooling liquid which is circulated from the tank and distributed over substantially the entire run of the conveyor as will now be described. The tank 10, as clearly seen in Figs. 1 and 3 extends laterally to one side of the conveyor 16, being provided with removable covers 31. The projecting portion of the tank 10 provides feed chambers 32 at the ends of the tank and an intermediate suction compartment 33 formed by a central imperforate wall 35 and a double row of screens 34 at the ends. Preferably, the screens 34 are removably mounted in the tank and the provision of a double row enables cleaning of the screens during precooling operations. Within suction compartment 33, overflow pipe 50 is removably mounted in a suitable drain pipe 51 leading from the bottom of the tank.

The liquid is withdrawn from the compartment 33 by a vertically disposed pump 36 which may be of usual turbine pump construction, having a motor 37 at the upper end of the discharge column 38, with a control switch 40 therefor mounted on the wall 12. The pump forms the conduit from the tank to the liquid distributing means and has a discharge outlet 38a communicating with a trough formed by vertically spaced U-shaped trough members 39 extending transversely between the walls 11 and 12. Lower trough member 39 is preferably apertured to permit gravity fall of liquid therefrom. The spacing of trough members 39 provides opposite slots 41 extending the entire width of the chamber so that water discharged from the pump outlet 38 into the trough will be projected outwardly in both directions through the openings 41.

Figure 4:
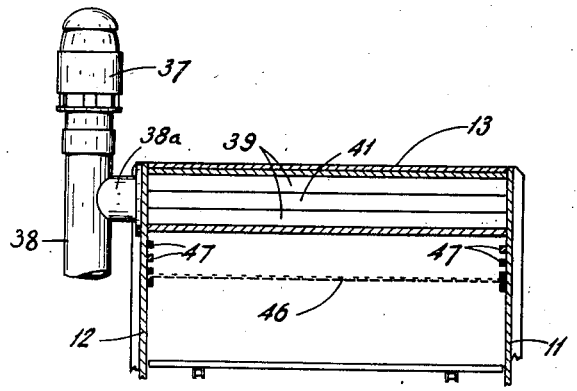
Fig. 4 is a fragmentary sectional view similar to Fig. 3, illustrating a modified form of construction.

Means is provided for receiving the pressure flow of the cooling liquid and for distributing it to obtain a uniform flooding fall of water over the entire area of the conveyor within the precooling chamber. For this purpose, a series of obliquely disposed overlapping slats 42 are mounted between the walls 11 and 12, to either side of the lower trough member 39. It will be noted that to either side of the trough, the slats 42 are angled in opposition to the discharge of liquid from the trough so that the velocity of the discharged liquid cannot project the liquid through onto the product on the conveyor, but the liquid must reverse its direction of travel, and flow by gravity between the slats and thereby produce a series of transverse sheets of liquid which fall on the product as it travels through the precooling chamber.

Where the space between the slats 42 and the conveyor 16 would produce too heavy an impact of the liquid on the product, a sectional screen 46 may be employed as shown in Fig. 4 which may be removably placed in a selected one of a series of longitudinally extending slots provided between a plurality of vertically spaced strips 47 secured along the inner faces of the walls 11 and 12. In this manner, the fall of the liquid may be again interrupted when desired, so that its impact when striking the product will be determined by its fall from the screen 46 rather than from the slats 42.

In operation, a cooling medium 48 such as cracked ice, for example, is dispersed throughout the stratum at the top of the body of water 32 so that a heat absorbing layer is provided over the entire surface of the cooling liquid in the tank. When the operation of the pump 36 is started, it withdraws water from the bottom of the tank 10, below the level of the layer of ice, i. e. the coldest water, and discharges the water into the trough formed by members 39 from which it is projected outwardly in either direction over the slats 42 to fall therethrough down over the conveyor and back into the liquid in the tank 10. The amount of cooling liquid should be sufficient so that the pumping element will always be below the layer of ice at the surface of the liquid. It will be noted that the liquid in reentering the tank 10 must pass through the heat removing medium provided therein. In this manner, the temperature of the water in the tank 10 may be reduced to the desired amount, say to a temperature of 33° F., at which time the produce may be fed onto the conveyor over the platform 16 and start its travel through the precooler, the conveyor being driven at the desired rate of speed with reference to the product being cooled, and the temperature of the water in the tank 10, to provide the desired temperature of the product when it is discharged over the platform 24. The product in passing through the precooler is subjected to a falling liquid in flood volume, the liquid being transferred quickly from the tank 10 to its point of fall so that it will lose very little of its cooling capacity. The flood volume character of the falling liquid insures that all parts of the product, whether in bulk or in crates, will be reached by the cooling liquid, and the constant flow of cooling liquid over the products insures the maintenance of a maximum temperature differential between the warmer interior of the product and its outer surface.

It has been found that crates of celery, for example, in passing through a precooler constructed in accordance with my invention will increase in weight approximately three pounds from the cooling liquid absorbed and because of the intimate contact provided between all parts of the product and the liquid which does not drain from the product, the actual cooling of the product will continue for a period of fifteen to twenty minutes after removal from the precooler. Because of the wide area provided for contact between the cooling liquid and the cooling medium provided by the cracked ice, substantially the entire heat absorbing capacity of the ice is utilized in effective cooling of the water.

As an example of the desired conditions in obtaining effective precooling, the tank 10 may be constructed to hold from 1200 to 1700 gallons when ready for operation and may be associated with a slat-type conveyor 5½' wide and having an effective length within the inclosed precooling chamber of substantially 20'. The conveyor may be driven at a rate of approximately 1.7' per minute and the pump operated to supply from 1600 to 2200 gallons per minute, which with the water cooled to approximately 33° F. gives a capacity of 304 #1 bushel pea hampers per hour, or 200 crates of celery per hour. It will be understood, of course, that the temperature, conveyor speed, pump capacity, and the like will vary in accordance with the product being precooled and with the condition of the product, i. e. whether packed or in bulk.

While I have shown and described a preferred apparatus and a preferred method for carrying out my invention, it will be understood that both are capable of variation and modification, while still employing the principles of my invention. It is to be understood, therefore, that the scope of the invention should be limited only by the scope and proper interpretation of the claims appended hereto.

I claim:

1. In a precooler comprising a tank, an enclosed chamber above said tank, a conveyor extending through said chamber above the liquid level in said tank, a trough mounted in said chamber in spaced relation above said conveyor and extending transversely to the direction of travel thereof, opposite series of transversely disposed slats extending to either side of said trough to provide a slotted partition above said conveyor, each series of slats being obliquely disposed with the slots formed therebetween facing away from said trough, and means for withdrawing liquid from said tank and discharging it into said trough.

2. A precooler comprising a tank, an enclosed chamber above said tank, a conveyor extending through said chamber above the liquid level in said tank and having a path of a horizontal cross-sectional area within said chamber substantially equal to that of said chamber, a trough mounted in said chamber in spaced relation above said conveyor and extending transversely to the direction of travel thereof, opposite series of transversely disposed slats extending to either side of said trough to provide a slotted partition above said conveyor, the slots of each series being obliquely disposed with the slots formed therebetween facing away from said trough, and means for withdrawing liquid from said tank and discharging it into said trough.

3. A precooler comprising an enclosed chamber, a tank below said chamber and projecting beyond one side thereof, a conveyor extending through said chamber above the liquid level in said tank, a trough mounted in said chamber in spaced relation above said conveyor and extending transversely to the direction of travel thereof, opposite series of transversely disposed slats extending to either side of said trough to provide a slotted partition above said conveyor, the slats of each series being obliquely disposed with the slots formed therebetween facing away from said trough, and a vertically extending pump having its suction end disposed in the projecting portion of said tank and having its discharge end opening into said trough.

4. A precooler comprising an enclosed chamber, a tank below said chamber, and projecting beyond one side thereof, a conveyor extending through said chamber above the liquid level in said tank, distributing means in said chamber for providing a flood volume fall of liquid supplied thereto over said conveyor, means forming a suction compartment in the projecting portion of said tank and comprising an intermediate imperforate side wall portion between said projecting portion and tank and screens associated therewith forming the end wall portions of said suction compartment, and a pump for transferring liquid from said suction compartment to said distributing means.

5. A precooler comprising an enclosed chamber, a tank below said chamber and projecting beyond one side thereof, the projecting portion of said tank having a screened compartment therein and another compartment open to the remainder of said tank, a conveyor extending through said chamber above the level of liquid in said tank, distributing means in said chamber extending throughout the horizontal cross-sectional area thereof for providing a flood volume fall of liquid supplied thereto over said conveyor, and pump means having its suction end disposed in said screened compartment below said liquid level and having its discharge end connected to said distributing means.

6. A precooler comprising a precooling chamber, a tank below said chamber, a conveyor for carrying products through said chamber, liquid distributing means in said chamber for supplying liquid to products on said conveyor, and a vertically disposed pump having liquid impelling means horizontally disposed below the level of liquid in said tank and its suction end supported by said tank open to receive liquid substantially radially thereof and having its discharge outlet secured to said chamber and communicating with said distributing means.

7. The method of precooling vegetables and like products, which comprises conveying the product through a cooling zone, establishing a body of cooling liquid in spaced relation to and beneath said cooling zone and having a surface area substantially co-extensive with the horizontal sectional area of said zone and disposed to receive liquid from said zone, providing an agglomeration of small pieces of ice floating at the upper surface of, and in a stratum substantially entirely covering, the body of liquid, withdrawing liquid from said body of liquid and distributing the withdrawn liquid above the conveyed product over an area in alignment with and substantially equal to the horizontal sectional area of the cooling zone to cause it to fall onto said product and drop therefrom back into said body of liquid through said stratum of ice.

8. The method of precooling vegetables and like products, which comprises conveying the product through a cooling zone, establishing a body of cooling liquid in spaced relation to and beneath said cooling zone and having a surface area substantially co-extensive with the horizontal sectional area of the cooling zone and exposed to liquid falling therefrom, providing an agglomeration of small pieces of ice floating at the upper surface of, and in a stratum substantially entirely covering, said body of liquid, withdrawing liquid from said body of liquid and distributing the withdrawn liquid above the conveyed product over an area in alignment with and substantially equal to the horizontal sectional area of the cooling zone to cause it to fall onto said product and drop therefrom back into said body of liquid through said stratum of ice; said withdrawn liquid being discharged in sufficient volume to substantially deluge the product in streams of flowing liquid.

9. The method of precooling vegetables and like products, which comprises conveying the product through a cooling zone, establishing a body of cooling liquid in spaced relation to and beneath said cooling zone and having a surface area substantially co-extensive with the horizontal sectional area of said cooling zone and disposed to receive liquid from said zone, providing an agglomeration of cracked ice floating at the upper surface of, and in a stratum substantially entirely covering, the body of liquid, withdrawing liquid from said body of liquid and distributing the withdrawn liquid above the conveyed product over an area in alignment with and substantially equal to the horizontal sectional area of the cooling zone to cause it to fall onto said product and drop therefrom back into said body of liquid through said stratum of ice.

10. The method of precooling vegetables and like products, which comprises conveying the product through a cooling zone, establishing and maintaining a body of cooling liquid in spaced relation to and beneath said cooling zone and having a surface area substantially co-extensive with the horizontal sectional area of the cooling zone and disposed to receive liquid from said zone, providing an agglomeration of small pieces of ice floating at the upper surface of, and in a stratum substantially entirely covering, said body of liquid, withdrawing liquid from beneath said stratum of ice, and discharging the same into and distributing it throughout a zone above and co-extensive with the cooling zone to cause it to fall onto said product and drop therefrom back into said body of liquid through said stratum of ice, said withdrawn liquid being discharged by gravity in sufficient volume to substantially deluge the product in streams of flowing liquid.

ROY M. MAGNUSON.